United States Patent [19]

Weber et al.

[11] Patent Number: 4,519,821
[45] Date of Patent: May 28, 1985

[54] MEANS FOR REMOVING A LAYER OF MATTED FIBERS FROM A FILTER DRUM

[75] Inventors: Kurt Weber, Elgg; Giancarlo Mondini, Winterthur; Gerhard Mandl, Bruetten, all of Switzerland

[73] Assignee: Rieter Machine Works, Ltd., Winterthur, Switzerland

[21] Appl. No.: 434,747

[22] Filed: Oct. 18, 1982

[30] Foreign Application Priority Data

Oct. 21, 1981 [CH] Switzerland .......................... 6712/81

[51] Int. Cl.³ ........................ B01D 46/04; B01D 46/26
[52] U.S. Cl. ......................................... 55/290; 55/296; 55/351
[58] Field of Search ................. 55/290, 295, 296, 301, 55/351, 400, 288, 502; 209/384, 389; 210/392, 398

[56] References Cited

U.S. PATENT DOCUMENTS

| | | | |
|---|---|---|---|
| Re. 24,521 | 8/1958 | Young | 55/290 |
| 1,697,647 | 1/1929 | Hancock et al. | 55/290 |
| 1,848,478 | 3/1932 | Haug | 210/392 X |
| 2,283,495 | 5/1942 | Evans | 210/392 |
| 2,473,501 | 6/1949 | Bahnson, Jr. | 55/351 X |
| 2,500,123 | 3/1950 | Gwaltney et al. | 55/290 |
| 2,560,581 | 7/1951 | Leffler | 210/392 |
| 2,561,282 | 7/1951 | Leffler | 210/392 |
| 3,628,313 | 12/1971 | Broadbent | 55/290 X |
| 3,789,587 | 2/1974 | Moorefield | 55/290 X |
| 4,226,715 | 10/1980 | Niederer et al. | 55/290 X |
| 4,294,597 | 10/1981 | Archer et al. | 55/290 X |
| 4,325,717 | 4/1982 | Crowley, Jr. | 55/290 |
| 4,360,369 | 11/1982 | Niederer | 55/290 X |
| 4,410,340 | 10/1983 | Wurmli | 55/290 |

FOREIGN PATENT DOCUMENTS

| | | | |
|---|---|---|---|
| 214854 | 1/1957 | Australia . | |
| 1106446 | 12/1955 | France | 210/392 |
| 614045 | 12/1948 | United Kingdom | 55/290 |

Primary Examiner—Kathleen J. Prunner
Attorney, Agent, or Firm—Kenyon & Kenyon

[57] ABSTRACT

A filter drum is screened off at the matted fibers take-off position on its interior face via a sealing membrane which is pressed by support sheets and a tightening element against the interior face. The drum is positioned within a housing whose interior is subjected to a suction force and is sealed off from the atmosphere by lip seals. A gap between a compression roll and a take-off roll is tightly filled by the compressed layer of matted fibers so that the entry of leakage air is prevented.

10 Claims, 8 Drawing Figures

MEANS FOR REMOVING A LAYER OF MATTED FIBERS FROM A FILTER DRUM

This invention relates to a means for removing a layer of matted fibers from a filter drum. More particularly, this invention relates to a means for removing a layer of matted fibers from a rotating filter drum within a filter housing.

Heretofore, various types of filters have been known for filtering out fibers from a flow of fiber-laden air. For example, one known filter includes a filter drum which is rotatably mounted within a housing and which is connected on the interior to a source of suction. During use, air is drawn through the filter drum while fibers are deposited onto the outer surface of the rotating drum. Generally, these filters have a means provided in a opening of the housing for stripping a layer of matted fibers from the filter drum. In such cases, the interior of the filter drum has been provided with a stationary cover which sealingly screens off the cylindrical portion of the drum from which the layer of matted fibers is being stripped from the interior of the drum which is at a lower pressure.

This type of filter and stripping means has frequently been used in ring-spinning machines. In such cases, the fibers collected by the aspiration system are recovered. Usually, the pressure loss in the system is due mostly to the resistances of the filter drum and the matted fibers. Of note, thicker fiber layers also operate as a filter and thereby support the separation of the fibers from the air flow. However, thicker fiber layers require higher suction forces. Further, higher suction forces produce larger quantities of false air (i.e., leakage air) at poorly sealed transition points between the movable and stationary elements.

Australian Pat. No. 214,854 describes a device for removing a layer of matted fibers which is comprised of a matted fiber compression roller, a matted fiber take-off roller and a cover which seals against entry of false air. In addition, the cover is provided with two narrow rubber seals which extend radially inwardly towards and which engage with an internal wall of a filter drum. By means of the rubber seals, the stationary cover forms a region on the filter drum which is sealingly screened off from the vacuum source. In addition, a housing surrounds the filter drum and has an infeed opening for the fiber transporting air and an outfeed opening in the region of the device for removing the layer of matted fibers for the removal of the fiber layer. However, a disadvantage of this construction is that the narrow rubber seals of the cover produce a poor sealing effect under a weak contact force. In the case of a strong contacting force, excessive wear occurs. As a result of the poor seal, the air stream drawn by suction and pressing the matted fibers against the filter drum is not completely interrupted in the matted fiber removal region. Hence, difficulties can arise in taking off the layer of matted fibers. A further disadvantage is that the outfeed opening is so formed that false air can enter into the housing through the infeed opening. This correspondingly reduces the quantity of fiber transporting air.

Accordingly, it is an object of the invention to provide an effective sealing arrangement for a rotating filter drum within a housing from which a matted fiber layer is removed.

It is another object of the invention to practically completely interrupt an air current in a matted fiber removal region of a filter drum arrangement.

It is another object of the invention to prevent the entrance of false air into a take-off region of a filter drum arrangement.

Briefly, the invention is directed to an arrangement having a filter housing with an opening, a cylindrical filter drum rotatably mounted in the housing for receiving a layer of matted fibers on the outer surface, means for generating a suction force within the drum and means for stripping the layer of fibers from the filter drum at the opening. In accordance with the invention, the means for stripping the layer of fibers includes a stationary cover within an interior of the drum which has a flexible sealing membrane engaging an internal wall of the filter drum in order to sealingly block the wall at the opening from the interior of the drum.

The cover also has means for pressing the sealing membrane against the internal wall of the drum. In one embodiment, the pressing means includes resilient support sheets which are in contact with the membrane as well as a tightening element for pressing the resilient sheets against the membrane. In addition, a foam rubber mat may be provided between the membrane and the sheets.

In another embodiment, the means for pressing the sealing membrane against the drum wall includes a secondary cover within the drum and an air bag which is filled with pressurized air and located between the secondary cover and the membrane.

The means for stripping the matted fiber layer also includes a compressing roll and a take-off roll in the housing opening which form a nip for removal of the matted fiber layer as well as a plurality of seals between the rolls and the housing for sealing the opening relative to the exterior of the housing.

These and other objects and advantages of the invention will become more apparent from the following detailed description taken in conjunction with the accompanying drawings wherein.

Figure 1:
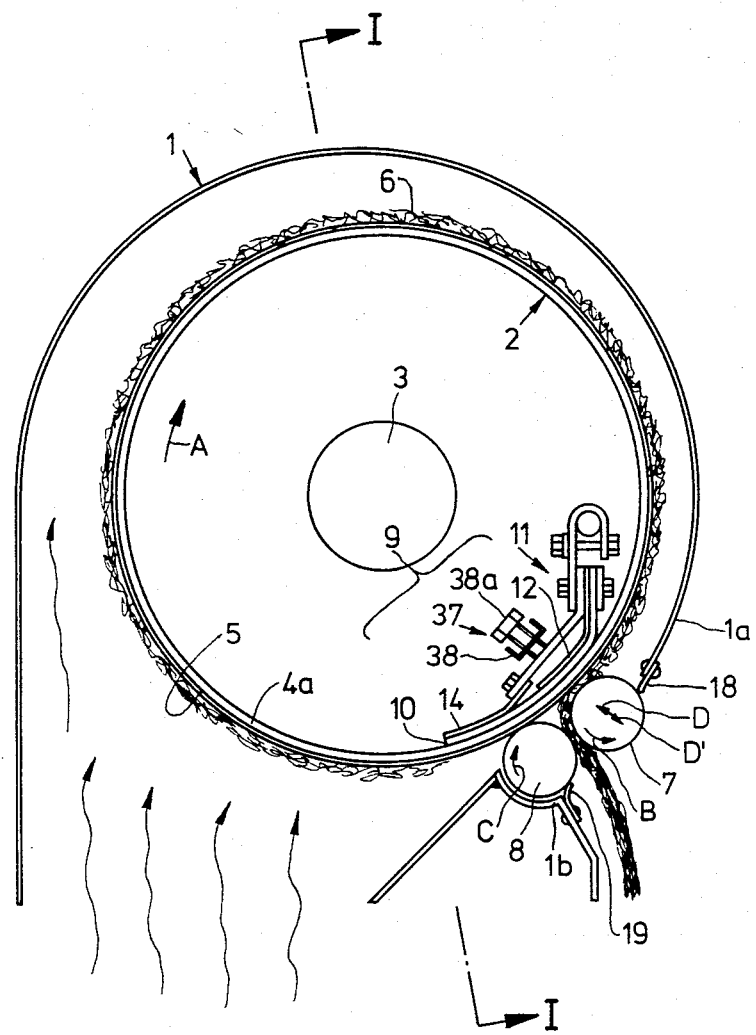
FIG. 1 illustrates a cross-sectional view of a filter drum arrangement constructed in accordance with the invention.

Referring to FIG. 1, a filter arrangement includes a filter housing 1 having an opening towards a lower portion and a cylindrical filter drum 2 which is rotatably mounted in the housing 1 for receiving a layer of matted fibers 6 on the outer perforated surface. The interior of the drum communicates on one side with an infeed 3 of a means for generating a suction force or underpressure, for example, a radial fan (see, FIG. 6). A suitable drive (not shown) is also provided to rotate the drum 2 either stepwise or continuously in the direction indicated by the arrow A.

Figure 6:
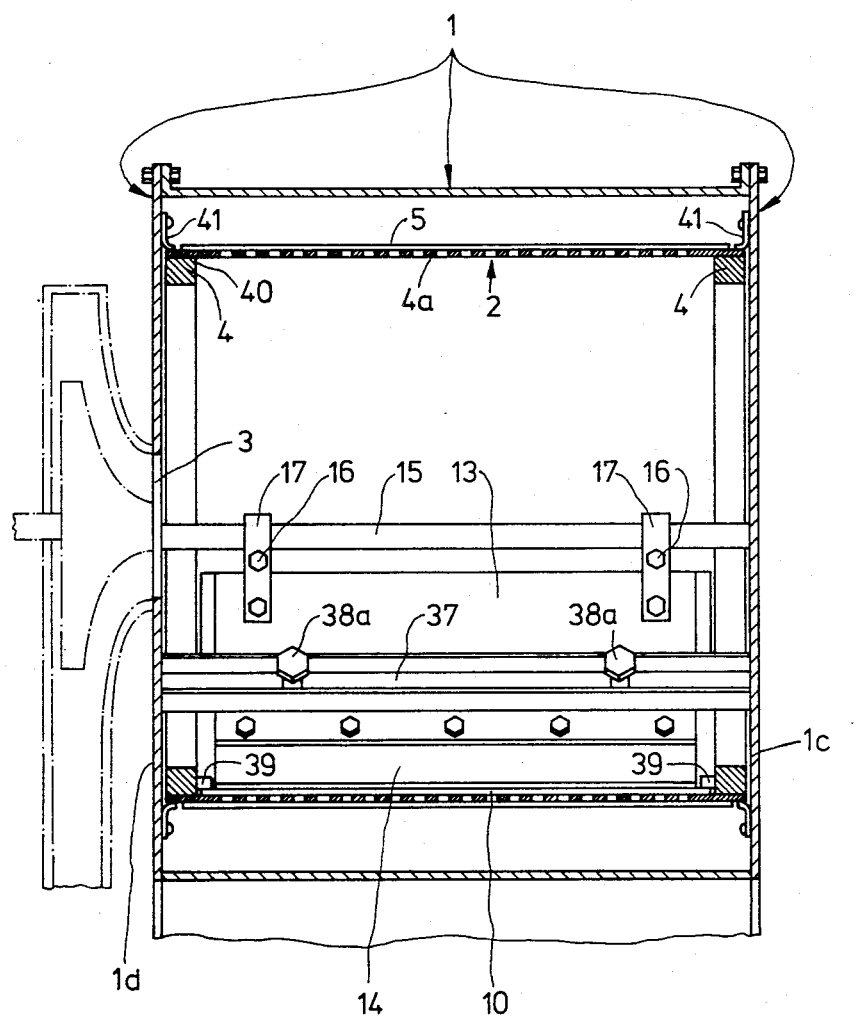
FIG. 6 illustrates a view taken on line I—I of FIG. 1.

Referring to FIG. 6, the filter drum 2 is formed of a perforated sheet metal casing 4a which is mounted on a pair of support rings 4 and upon which a filter cloth 5 is mounted.

During use, fibers and impurities which are transported by a transporting air current (indicated in FIG. 1 with wavey arrows) is drawn in by the fan and settled on the filter cloth 5 to form the layer of matted fibers 6. As indicated in FIG. 1, the layer is of increasing thickness.

Referring to FIG. 1, means are provided for stripping the layer of fiber 6 from the filter drum 2 at the opening 15 in the housing 1. This means is composed substantially of a matted fibers compressing roll 7, a matted fibers take-off roll 8 and a cover 9.

The rolls 7, 8 are each rotatably mounted and driven and have a smooth but matte surface. As indicated, the rolls 7, 8 rotate in opposite directions B, C and form a nip for the removal of the layer 6.

The cover 9 is fixably mounted within the drum 2 so as to be stationary. As indicated, the cover 9 has a flexible sealing membrane 10 which engages an internal wall of the filter drum 2 in order to sealingly screen the wall at the opening from the interior of the drum 2. The membrane 10 screens off the perforated metal casing 4a on the interior side so tightly that at least in the region in which the fiber layer 6 must be stripped from the drum 2, the passage of air into the interior of the drum is obstructed such that, at this location, no dynamic air pressure (back pressure) is applied to the fiber layer 6. This region corresponds substantially to the spacing between those positions on the circumference of the drum 2 at which the rollers 7, 8 are adjacent to the drum 2.

The sealing membrane 10 is made of a flexible wear-resistent rubbery material, for example, polyurethane of 3 mm thickness, or of a spring steel sheet, for example of 0.15 mm thickness glued to a 1 mm thick Habasite belt. As shown, the membrane 10 is secured in a stationary holder 11 at the front end, as viewed in the direction of rotation of the filter drum 2.

Figure 2:
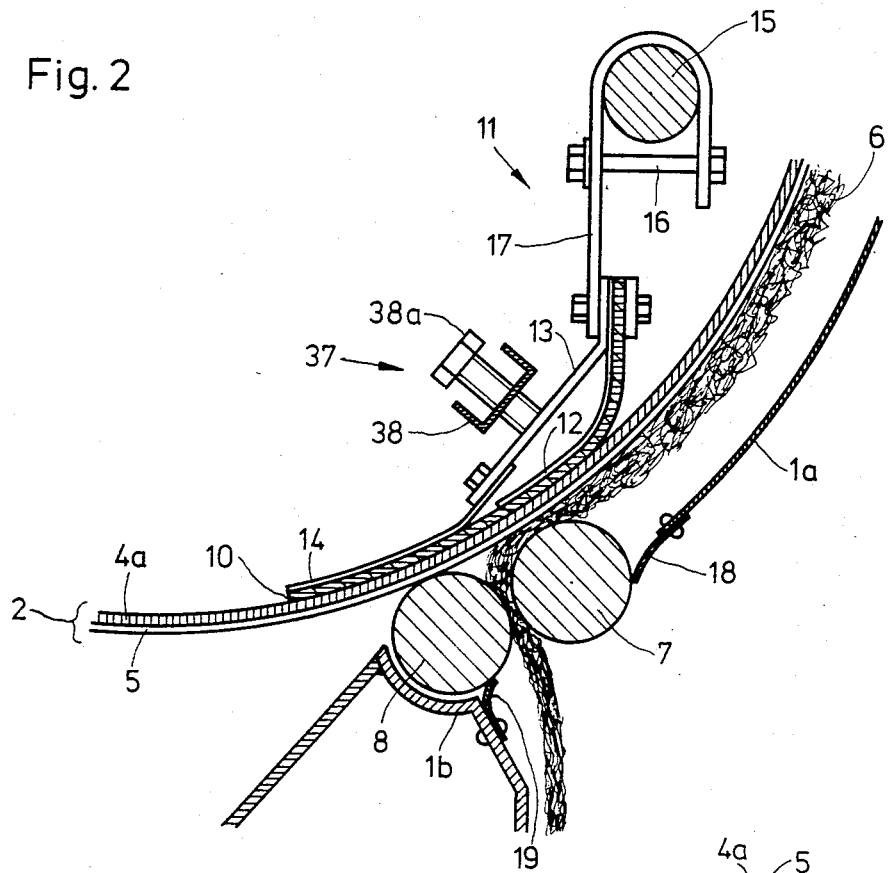
FIG. 2 illustrates an enlarged view of the means for stripping a matted layer from the filter drum illustrated in FIG. 1.

Referring to FIG. 2, a means for pressing the sealing membrane 10 against the internal wall of the drum 2 is also provided. As shown, this latter means includes a pair of resilient support sheets 12, 14 which contact the membrane 10, one of which is secured with the membrane 10 and a support 13 in the holder 11 while the other sheet 14 is secured to the end of the support 13. Both sheets are made of spring steel sheet and by means of a pretension force press the membrane 10 entirely along the surface of contact of the membrane 10 with the drum 2 against the internal wall of the drum 2. Alternatively, the sheets 12, 14 can be made of individual circumferentially directed sheet metal strips which are secured to the holder 11 or to the support 13.

As shown in FIG. 2, the holder 11 also includes a stirrup 17 which is secured by screws 16 on a cylindrical steel rod 15. The roundness of the rod 15 permits rotation of the stirrup 17 and thus adaptation of the contact force of the sealing membrane 10. As indicated in FIG. 6, the rod 15 is secured to the housing 1.

In order to adjust the pretension of the sheets 12, 14 and, thus, the contact pressure of the sealing membrane 10 on the perforated casing 4a, a tightening element 37 is provided. This element 37 consists of a pair of adjusting screws 38a which are threaded into a strap 38 which extends across the interior of the drum 2 and is connected to the housing 1. The screws 38a serve to press against the supports 13. Of note, the screw 16 for the stirrup 17 must be released for the adjustment of the contact pressure. Further, if the sheets 12, 14 are divided into individual supporting sheets, then individual sheets require an adjusting screw 38a.

Referring to FIG. 1, the opening in the housing for the rolls 7, 8 is limited by the housing portions 1a, 1b, 1c, 1d. As shown in FIG. 2, a lip seal 18 is secured to the housing portion 1a to sealingly contact the compressing roll 7 while a second lip seal 19 is secured to the housing portion 1b to sealingly contact the take-off roll 8. The interior of the housing 1 is thus screened off from the atmosphere on the one hand by the narrow gap or nip formed between the rolls 7, 8 and by the lip seals 18, 19.

Figure 3:
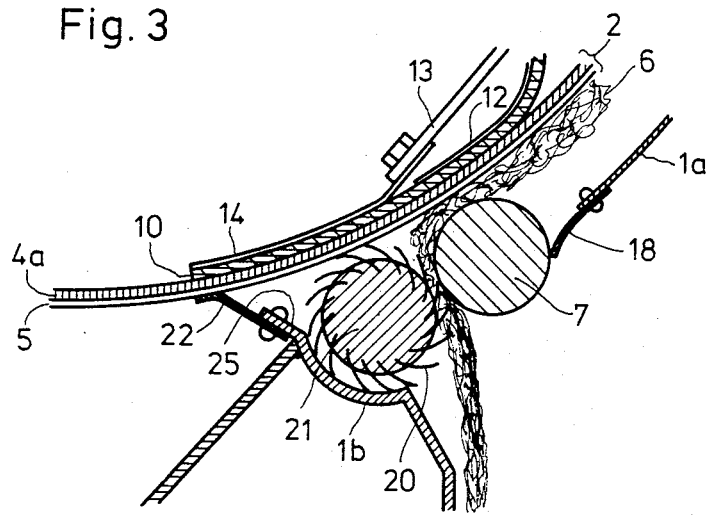
FIG. 3 illustrates a modified stripping means in accordance with the invention.

Referring to FIG. 3, wherein like reference characters indicate like parts as above, instead of using a smooth take-off roll 8, the roll 21 may be provided with a plurality of circumferentially disposed elastic lips 20 which sealingly contact a curved wall portion 1b of the housing during rotation of the roll 21. In this case, the housing 1 is also provided with a housing portion 25 to which a third lip seal 22 is secured in order to sealingly contact the filter drum 2, and particularly the filter cloth 5. This third lip seal 22 performs the function of the second lip seal 19 which is not used.

The elastic lips 20 engage the housing portion 1b and, thus, form an initial seal between the housing interior and the exterior atmosphere.

Figure 4:
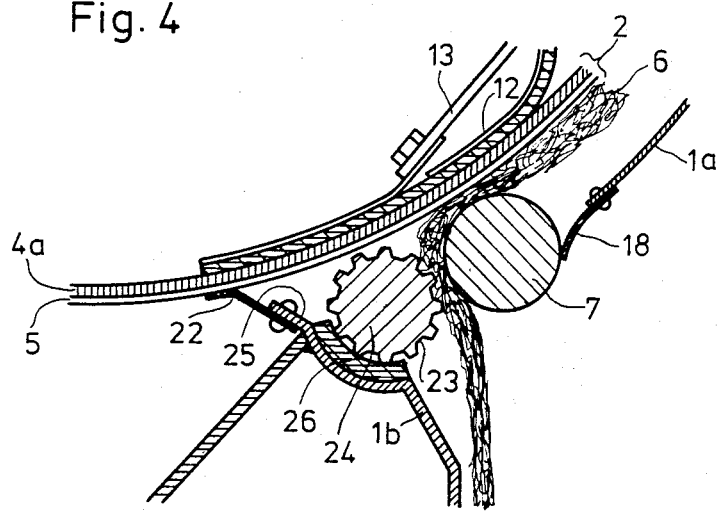
FIG. 4 illustrates a view of a further modified stripping means in accordance with the invention.

Referring to FIG. 4, wherein like reference characters indicate like parts as above, the take-off roll may be in the form of a roller 24 provided with grooves 23. In addition, an intermediate layer 26 which is springy towards the roll 24 can be provided between the roll 24 and the housing portion 1b. Such a layer 26 may be formed of polyurethane and be fixably connected to the housing portion 1b. Polyurethane permits sliding of the roll 24 on the layer 26. In addition, a lip seal 22 is also provided.

Figure 5:
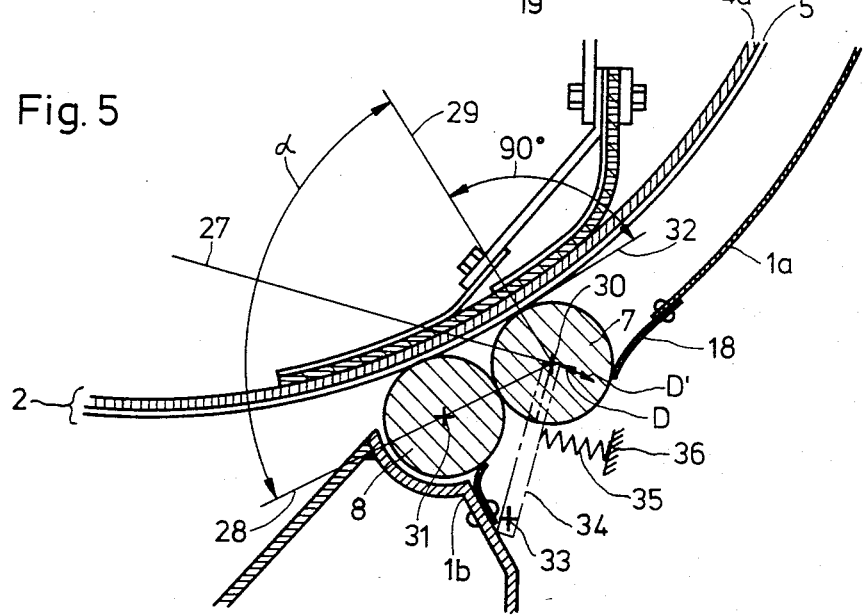
FIG. 5 illustrates a view similar to FIG. 2 of a mounting arrangement for the rolls of the stripping means in accordance with the invention.

Referring to FIG. 5, at the start of operation, the compressing roll 7 is in a starting position against the drum 2, that is as long as the drum 2 is not covered by a matted fiber layer 6. At the same time, the roll 7 contacts the take-off roll 8. In addition, the roll 7 is pivotally mounted as to pivot from this position in the direction indicated by the arrow D'. As indicated the direction of pivot (as indicated by the arrows D, D') corresponds practically with a plane corresponding to a bisector 27 of an angle defined by two planes 28, 29. One plane 28 passes through the rotation axis 30 of the roll 7 when located in the starting position and through the rotation axis 31 of the take-off roll 8. As such, the plane 28 passes through a point of tangential contact between the rolls 7, 8. The plane 29 passes through the axis 30 and extends at a right angle to a tangent 32 common to the filter drum 2 and the roll 7. As such, the plane 29 passes through a point of tangential contact between the compressing roll 7 and the drum 2.

The pivotability of the compression roll 7 in the direction D or D' is achieved because the roll is supported at both end faces in pivot arms 34 (only one of which is shown). These arms 34 are pivotable about an axis 33 and extend in the starting position of the roll 7 normal to the bisector 27 of the angle $\alpha$.

The roll 7 is pressed in the direction D against the layer of fiber 6 by pressure springs 35 each of which is compressed between a housing part 36 and a swing arm 34.

Referring to FIG. 6, as noted above, the sealing membrane 10 covers the perforations (non-hatched parts) of the perforated metal casing 4a in such a manner that even at the sides practically no air can pass into the interior of the filter drum 2 in a region having sealing membrane 10. If through careless handling or other influences, the filter drum 2 is possibly dented, that is provided with recesses, in the edge regions, then in order to obstruct the penetration of air at the sides, the edges of the membrane 10 adjoining the supporting rings 4 are provided with a felt strip 39. Each felt strip 39 sealingly engages the internal surface 40 of a support ring 4 which faces axially towards the interior so as to seal the drum interior from the exterior. Each strip 39 can, for example, be glued to the sealing membrane 10.

As shown, ring lip seals 41 may also be provided on the side walls 1c, 1d of the housing 1 to engage tightly against the perforated metal casing 4a so as to prevent penetration of false air into the filter drum interior.

Figure 7:
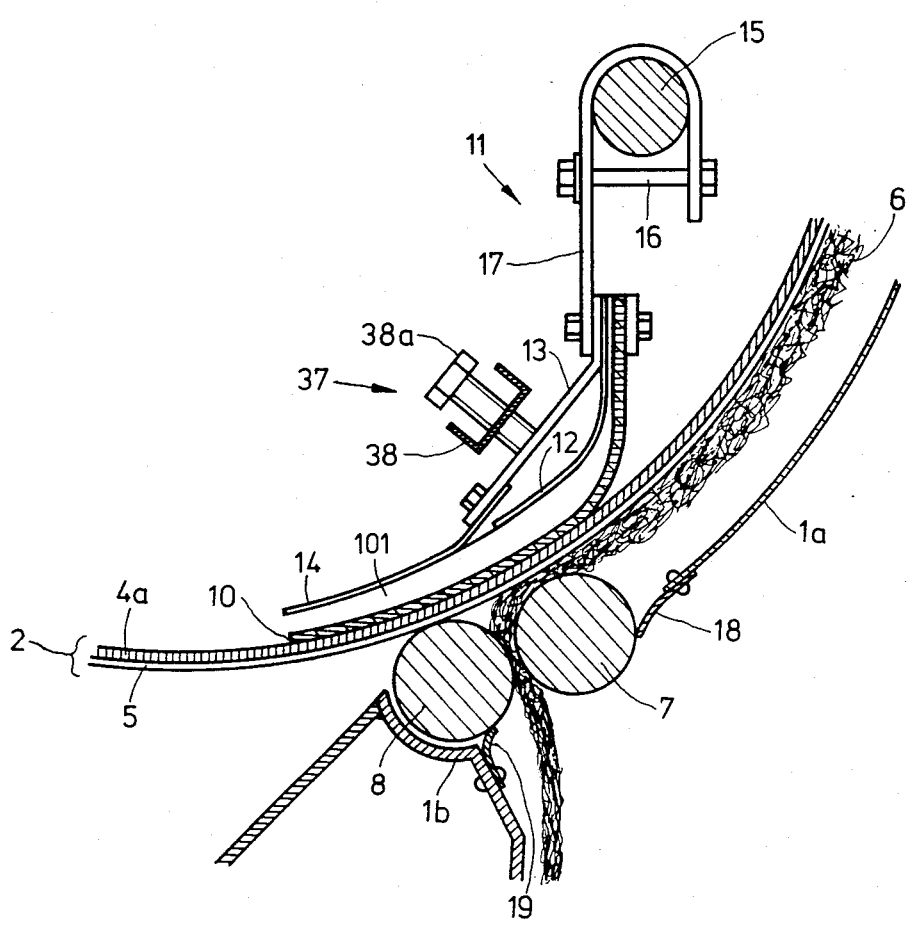
FIG. 7 illustrates a view similar to FIG. 2 of a modified construction employing a layer of foam rubber in accordance with the invention.

Referring to FIG. 7, wherein like reference characters indicate like parts as above, a layer of foam rubber 101 can be provided between the sheets 12 or 14 and the sealing membrane 10 in order to be able to follow the movements of a perforated metal casing having minor irregularities.

Figure 8:
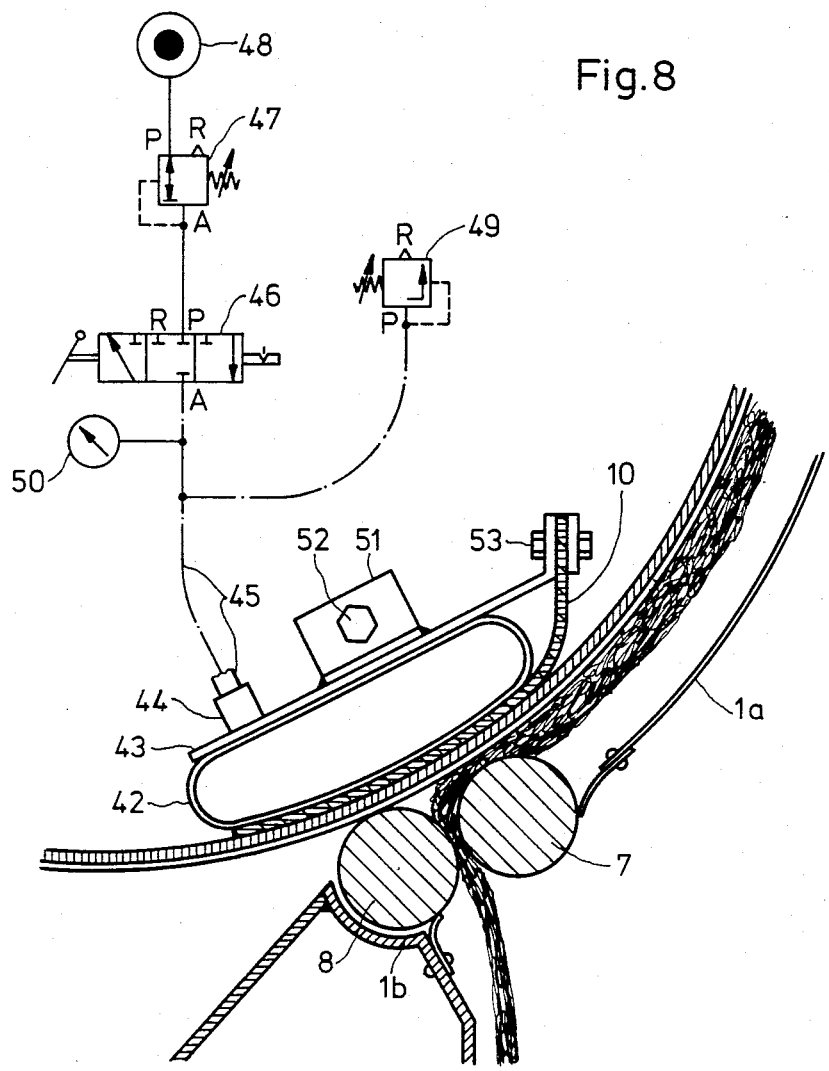
FIG. 8 illustrates a further modified construction in accordance with the invention.

Referring to FIG. 8, the means for pressing the membrane 10 against the filter drum 2 may utilize a secondary cover 43 and an air bag 42 which is filled with pressurized air and which is located between the secondary cover 43 and the membrane 10. The bag 42 may be secured to the cover 43 in any suitable manner. In addition, a means for supplying compressed air to the air bag 42 is also provided. As indicated, this latter means includes an air feed tube 45 which is connected to the air bag 42 by means of a connector nipple 44. This tube 45 leads through the side wall 1c of the housing 1 opposite to the fan and is connected outside the housing by way of a three-way-valve 46 with a closed central setting and a pressure regulating valve 47 with an air exhaust opening R to a pressure air source 48. Further, an adjustable pressure regulating valve 49 (i.e., an overflow valve) with an air exhaust opening R and a manometer 50 are connected to the air feed tube 45 between the nipple 44 and the valve 46 outside the housing 1.

If for operation the air bag is to be supplied with pressure air, the valve 46 is switched from the central setting shown in FIG. 8 into a setting in which the connector points P, A are connected. By means of the pressure regulating valve 47 the air bag can be supplied with a desired pressure which is readable on the manometer 50. After this pressure has been reached, the valve 46 is returned to the central setting so that even upon loss of pressure in the air feed system, the air pressure in the bag 42 is maintained.

If, upon an interruption of operation, the air bag is to be exhausted, the valve 46 is moved to the third setting in which the connector points A, R are connected to one another. Thus, the air in the bag 42 can escape to the atmosphere.

The valve 49 protects the air bag 42 from excess pressure.

As shown, the secondary cover 43 is secured to each side wall of the housing via angle members 51 connected to the support plate and by screws 52. The sealing membrane 10 is secured by a screw connector 53 to the cover 43.

The invention thus provides a structure wherein the stripping of matted fibers in the removal region of a filter drum is achieved with greater certainty and with substantially no unnecessary false air which would otherwise make operation more expensive.

Further, the invention provides a sealing arrangement which permits the layer of matted fibers to be stripped off with certainty at the take-off position. In this regard, the seals insure that there is no throughflow of air at the take-off position on the filter drum.

What is claimed is:

1. In combination,
    a filter housing having an opening and an inlet for entry of fiber laden air;
    a cylindrical filter drum rotatably mounted in said housing for receiving a layer of matted fibers on an outer perforated surface thereof;
    means for generating a suction force within said drum;
    means for stripping the layer of fibers from said filter drum at said opening, said means including a rotatable compressing roll and a rotatable take-off roll in said opening and forming a nip for removal of the matted fiber layer, said compressing roll being in tangential contact at a first point with said drum with a first plane extending through said point and an axis of rotation of said compressing roll and being in tangential contact at a second point with said take-off roll with a second plane extending through said second point and said axis of rotation to define a given angle with said first plane and a flexible sealing membrane engaging an internal wall of said filter drum to sealingly block off said wall at said opening from the interior of said drum;
    means for pressing said sealing membrane against said internal wall of said drum entirely along the surface of contact of said membrane with said drum; and
    said compressing roll being pivotally mounted to move in a plane corresponding to a bisector of said angle to move from said take-off roll and said drum.

2. The combination as set forth in claim 1 wherein said means for pressing includes at least one resilient support sheet in contact with said membrane.

3. The combination as set forth in claim 2 wherein said means for pressing further includes a stationary tightening element including adjusting screws for pressing said sheet against said membrane.

4. The combination as set forth in claim 3 wherein said means for pressing further includes a foam rubber mat between said membrane and said sheet.

5. The combination as set forth in claim 1 wherein said means for pressing includes a secondary cover within said drum and an air bag filled with pressurized air between said secondary cover and said membrane.

6. The combination as set forth in claim 5 which further comprises means for supplying compressed air to said air bag, said latter means including a pressure regulating valve and a three way valve for adjusting the pressure of the supplied air.

7. The combination as set forth in claim 1 wherein said drum includes a pair of support rings and a perforated sheet metal casing received on said rings and which further comprises a felt strip between said membrane and each support ring for sealing said drum interior from the exterior thereof.

8. The combination as set forth in claim 1 wherein said means for stripping includes a plurality of seals between said rolls and said housing for sealing said opening relative to the exterior of said housing.

9. The combination as set forth in claim 8 wherein said housing has a concavely curved wall adjacent said take-off roll and said take-off roll includes a plurality of circumferentially disposed elastic lips to sealingly contact said curved wall during rotation of said take-off roll.

10. The combination as set forth in claim 9 which further comprises a lip seal secured to said housing adjacent said opening and sealingly contacting said drum to seal the interior of said housing from the exterior thereof.

* * * * *